United States Patent
Burckhardt et al.

(10) Patent No.: US 11,407,893 B2
(45) Date of Patent: Aug. 9, 2022

(54) TWO-COMPONENT POLYURETHANE COMPOSITION WITH ADJUSTABLE POT LIFE

(71) Applicant: SIKA TECHNOLOGY AG, Baar (CH)

(72) Inventors: Urs Burckhardt, Zürich (CH); Michael Schlumpf, Stallikon (CH); Antonio Corsaro, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 105 days.

(21) Appl. No.: 16/623,921

(22) PCT Filed: Jun. 29, 2018

(86) PCT No.: PCT/EP2018/067555
§ 371 (c)(1),
(2) Date: Dec. 18, 2019

(87) PCT Pub. No.: WO2019/002538
PCT Pub. Date: Jan. 3, 2019

(65) Prior Publication Data
US 2020/0207980 A1 Jul. 2, 2020

(30) Foreign Application Priority Data

Jun. 30, 2017 (EP) ..................................... 17179020

(51) Int. Cl.
| | | |
|---|---|---|
| *C08L 75/04* | (2006.01) | |
| *C08G 18/22* | (2006.01) | |
| *C08G 18/32* | (2006.01) | |
| *C08G 18/38* | (2006.01) | |
| *C08G 18/76* | (2006.01) | |
| *C09J 175/04* | (2006.01) | |

(52) U.S. Cl.
CPC ............ *C08L 75/04* (2013.01); *C08G 18/227* (2013.01); *C08G 18/3206* (2013.01); *C08G 18/3876* (2013.01); *C08G 18/3893* (2013.01); *C08G 18/7657* (2013.01); *C09J 175/04* (2013.01)

(58) Field of Classification Search
CPC .................................................. C08G 18/227
See application file for complete search history.

(56) References Cited

U.S. PATENT DOCUMENTS

| | | | |
|---|---|---|---|
| 4,788,083 A | 11/1988 | Dammann et al. | |
| 5,587,448 A * | 12/1996 | Engen ................... | C08G 18/08 427/290 |
| 6,348,121 B1* | 2/2002 | Schoener ............. | C08G 18/089 156/307.1 |
| 6,548,615 B1* | 4/2003 | Groth .................. | C08G 18/288 528/48 |
| 9,745,401 B2* | 8/2017 | Van Steenis ....... | C08G 18/4063 |
| 2015/0259465 A1 | 9/2015 | Burckhardt et al. | |

FOREIGN PATENT DOCUMENTS

| | | |
|---|---|---|
| CN | 1082967 C | 4/2002 |
| EP | 0454219 A1 | 10/1991 |
| EP | 2706073 A1 | 3/2014 |
| EP | 2791153 B1 | 11/2015 |
| EP | 1551895 B1 | 1/2017 |
| JP | H10-511727 A | 11/1998 |
| JP | 2011-079893 A | 4/2011 |
| JP | 2015-534590 A | 12/2015 |

OTHER PUBLICATIONS

Oct. 9, 2018 International Search Report issued in International Patent Application No. PCT/EP2018/067555.

Dec. 31, 2019 International Preliminary Report on Patentability issued in International Patent Application No. PCT/EP2018/067555.

\* cited by examiner

*Primary Examiner* — Michael M Dollinger
(74) *Attorney, Agent, or Firm* — Oliff PLC

(57) ABSTRACT

A polyurethane composition including a first and a second component, wherein the first component is a polyol with an OH functionality in the range from 1.5 to 4 and a mean molecular weight in the range from 250 to 15,000 g/mol, a diol with two hydroxyl groups which are linked via a C2 to C0 carbon chain, and a compound that includes at least one thiol group. One of the two components also additionally contains at least one metal catalyst for the reaction of hydroxyl groups and isocyanate groups which can form thio complexes, and the second component contains enough polyisocyanate that at least 5% by weight of isocyanate groups, in relation to the total polyurethane composition, are contained, and the molar ratio of all thiol groups of the mentioned compound to all metal atoms of the metal catalyst is between 1:1 and 250:1.

18 Claims, No Drawings

TWO-COMPONENT POLYURETHANE COMPOSITION WITH ADJUSTABLE POT LIFE

TECHNICAL FIELD

The invention relates to the field of two-component polyurethane compositions and to the use thereof, in particular as adhesive or as matrix in composite materials.

PRIOR ART

Two-component polyurethane compositions based on polyols and polyisocyanates have already been used for some time. Two-component polyurethane compositions have the advantage over one-component compositions that they cure rapidly after mixing and can therefore absorb and transmit higher forces after just a short time. For use as structural adhesives or as matrix (binder) in composite materials, such compositions must meet high demands as regards strength and adhesive forces, since such adhesives are elements of load-bearing structures. In particular, such compositions when cured need to have good mechanical properties such as high moduli of elasticity, while having low elongation values and high tensile strength and tensile shear strength, but must not be brittle at the same time. It is moreover desirable, for example in industrial manufacturing, for such compositions to cure as rapidly as possible, which reduces throughput times.

In order to achieve the desired mechanical properties and, especially, particularly rapid curing, it is advantageous if such compositions contain high proportions of isocyanates that are present in one of the two components in the form of free or polymer-bound polyisocyanates and that, after mixing with the other component, which contains polyols, cure to form a polymeric network. A high content of isocyanates does, however, lead to problems. Particularly with the use of crosslinking catalysts, which is essential for selective, optimal crosslinking and curing, such two-component systems become almost uncontrollably fast and pot lives much too short for use, for example, as a structural adhesive. In the case of use as a binder in composite materials, the pot life also needs to be long enough to allow fibers to be embedded homogeneously in the matrix.

For the use of two-component polyurethane compositions, it would generally be desirable if an adequately long pot life can be combined with subsequently very rapid curing and extremely rapid hardening. However, this is hardly achievable with current two-component compositions. Either the pot life is very short in the case of compositions that cure and harden quickly or else curing and hardening are slow when processing compositions that have a long pot life.

There is therefore a desire for two-component polyurethane compositions that have excellent mechanical properties and adhesion properties and that, after application, cure very rapidly and exhibit strength and elasticity within the shortest possible time, for example hours to a few days, when used in structural bonding or composite materials. However, they also need to have a sufficiently long pot life that allows processing of relatively large structural or manufacturing components as well. It would additionally be desirable if the pot life of such compositions is able to be tailored to the desired use.

SUMMARY OF THE INVENTION

The object of the present invention is therefore to provide a two-component polyurethane composition that cures very rapidly to form a mechanically excellent mass suitable as structural adhesive or as matrix for composite materials, but at the same time has an adequately long pot life that can be adjusted within certain limits, allowing it to be processed without problem.

This object is surprisingly achieved with the polyurethane composition according to the invention as claimed in claim 1. The composition comprises a polyol, a short-chain diol, and also a compound having at least one thiol group in the first component and a high content of polyisocyanate in the second component. For curing the composition, the composition further contains a metal catalyst that is able to form thio complexes, with the ratio of thiol groups to metal atoms in the composition being fixed. The composition has very high strength and good elasticity when cured. After mixing the components and after an adequately long pot life that can be adjusted within certain limits, it cures very rapidly and achieves very good mechanical values after just a short time, for example a few hours to one day.

Further aspects of the invention are the subject of further independent claims. Particularly preferred embodiments of the invention are the subject of the dependent claims.

WAYS OF CARRYING OUT THE INVENTION

The present invention relates to a polyurethane composition consisting of a first and a second component; wherein
the first component A comprises
at least one polyol A1 having an OH functionality in the range from 1.5 to 4 and a mean molecular weight in the range from 250 to 15 000 g/mol, and
at least one diol A2 having two hydroxyl groups that are linked via a C2 to C9 carbon chain, and
at least one compound T that has at least one thiol group; and
the second component B comprises
at least one polyisocyanate I;
wherein one of the two components additionally comprises at least one metal catalyst K for the reaction of hydroxyl groups and isocyanate groups that is able to form thio complexes and
the second component contains sufficient polyisocyanate I for it to comprise at least 5% by weight of isocyanate groups based on the overall polyurethane composition, and
the molar ratio of all the thiol groups in the at least one compound T to all metal atoms in the at least one metal catalyst K is between 1:1 and 250:1.

The prefix "poly" in substance names such as "polyol", "polyisocyanate", "polyether" or "polyamine" in the present document indicates that the respective substance formally contains more than one of the functional group that occurs in its name per molecule.

In the present document the term "polymer" firstly encompasses a group of macromolecules that are chemically uniform but differ in the degree of polymerization, molar mass, and chain length, said group having been produced by a "poly" reaction (polymerization, polyaddition, polycondensation).

The term secondly also encompasses derivatives of such a group of macromolecules from poly reactions, i.e. compounds that have been obtained by reactions, for example additions or substitutions, of functional groups on defined macromolecules and that may be chemically uniform or chemically nonuniform. The term further encompasses so-called prepolymers as well, i.e. reactive initial oligomeric adducts, the functional groups of which are involved in the construction of macromolecules.

The term "polyurethane polymer" encompasses all polymers produced according to the so-called diisocyanate polyaddition process. This also includes polymers that are virtually or completely free of urethane groups. Examples of polyurethane polymers are polyether polyurethanes, polyester polyurethanes, polyether polyureas, polyureas, polyester polyureas, polyisocyanurates and polycarbodiimides.

In the present document, "molecular weight" is understood to mean the molar mass (in grams per mole) of a molecule or a molecule residue. "Mean molecular weight" refers to the number average $M_n$ of a polydisperse mixture of oligomeric or polymeric molecules or molecule residues, which is typically determined by gel-permeation chromatography (GPC) against polystyrene as standard. In the present document, "room temperature" refers to a temperature of 23° C. Percent by weight values, abbreviated wt.-%, refer to the proportions by mass of a constituent in a composition based on the overall composition, unless otherwise stated. The terms "mass" and "weight" are used synonymously in the present document.

A "primary hydroxyl group" refers to an OH group attached to a carbon atom having two hydrogens.

In this document, the "pot life" refers to the time within which, after mixing the two components, the polyurethane composition can be processed before the viscosity resulting from the progression of the crosslinking reaction has become too high for further processing.

The term "strength" in the present document refers to the strength of the cured composition, with strength meaning in particular the tensile strength and modulus of elasticity, particularly within the 0.05% to 0.25% region of elongation.

In the present document, "room temperature" refers to a temperature of 23° C. A substance or composition is described as "storage-stable" or "storable" if it can be stored at room temperature in a suitable container over a prolonged period, typically for at least 3 months up to 6 months or more, without this storage resulting in any change in its application or use properties, particularly in the viscosity and crosslinking rate, to an extent relevant to the use thereof. All industry standards and norms mentioned in this document relate to the versions valid at the date of first filing.

The first component A comprises firstly at least one polyol A1 having an OH functionality in the range from 1.5 to 4 and a mean molecular weight in the range from 250 to 15 000 g/mol.

Suitable polyols A1 are in principle all polyols currently used in the production of polyurethane polymers. Particularly suitable are polyether polyols, polyester polyols, poly(meth)acrylate polyols, polybutadiene polyols, polycarbonate polyols, and also mixtures of these polyols.

Suitable polyether polyols, also known as polyoxyalkylene polyols or oligoetherols, are in particular those that are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as water, ammonia or compounds having a plurality of OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the recited compounds. Employable are both polyoxyalkylene polyols having a low degree of unsaturation (measured according to ASTM D-2849-69 and expressed in milliequivalents of unsaturation per gram of polyol (mEq/g)), produced for example using so-called double metal cyanide complex catalysts (DMC catalysts), and polyoxyalkylene polyols having a relatively high degree of unsaturation, produced for example using anionic catalysts such as NaOH, KOH, CsOH or alkali metal alkoxides.

Particularly suitable are polyoxyethylene polyols and polyoxypropylene polyols, in particular polyoxyethylene diols, polyoxypropylene diols, polyoxyethylene triols, and polyoxypropylene triols.

Particularly suitable are polyoxyalkylene diols or polyoxyalkylene triols having a degree of unsaturation lower than 0.02 mEq/g and having a molecular weight in the range from 1000 to 15 000 g/mol, as are polyoxyethylene diols, polyoxyethylene triols, polyoxypropylene diols and polyoxypropylene triols having a molecular weight of 400 to 15 000 g/mol.

Likewise particularly suitable are so-called ethylene oxide-terminated (EO-endcapped/ethylene oxide-endcapped) polyoxypropylene polyols. The latter are special polyoxypropylene polyoxyethylene polyols that are obtained for example when pure polyoxypropylene polyols, in particular polyoxypropylene diols and triols, after completion of the polypropoxylation reaction, are further alkoxylated with ethylene oxide and thus have primary hydroxyl groups. Preferred in this case are polyoxypropylene polyoxyethylene diols and polyoxypropylene polyoxyethylene triols.

Also suitable are hydroxyl-terminated polybutadiene polyols, for example those produced by polymerization of 1,3-butadiene and allyl alcohol or by oxidation of polybutadiene and also the hydrogenation products thereof.

Also suitable are styrene-acrylonitrile grafted polyether polyols such as those commercially available under the trade name Lupranol® from Elastogran GmbH, Germany.

Suitable polyester polyols include in particular polyesters that bear at least two hydroxyl groups and are produced by known processes, in particular polycondensation of hydroxycarboxylic acids or polycondensation of aliphatic and/or aromatic polycarboxylic acids with dihydric or polyhydric alcohols. More suitable are polyester polyols produced from dihydric to trihydric alcohols such as 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the abovementioned alcohols with organic dicarboxylic acids or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone. Particularly suitable are polyester diols, in particular those produced from adipic acid, azelaic acid, sebacic acid, dodecanedicarboxylic acid, dimer fatty acid, phthalic acid, isophthalic acid and terephthalic acid as the dicarboxylic acid or from lactones such as ε-caprolactone and from ethylene glycol, diethylene glycol, neopentyl glycol, 1,4-butanediol, 1,6-hexanediol, dimer fatty acid diol, and 1,4-cyclohexanedimethanol as the dihydric alcohol.

Suitable polycarbonate polyols include in particular those obtainable by reaction for example of the abovementioned alcohols used to construct the polyester polyols with dialkyl carbonates such as dimethyl carbonate, diaryl carbonates such as diphenyl carbonate, or phosgene. Likewise suitable are polycarbonates obtainable from the copolymerization of $CO_2$ with epoxides such as ethylene oxide and propylene oxide. Polycarbonate diols, in particular amorphous polycarbonate diols, are particularly suitable.

Further suitable polyols are poly(meth)acrylate polyols.

Also suitable are polyhydroxy-functional fats and oils, for example natural fats and oils, in particular castor oil, or so-called oleochemical polyols obtained by chemical modification of natural fats and oils, the epoxy polyesters or epoxy polyethers obtained for example by epoxidation of unsaturated oils and subsequent ring opening with carboxylic acids or alcohols respectively, or polyols obtained by hydroformylation and hydrogenation of unsaturated oils. Also suitable are polyols obtained from natural fats and oils by degradation processes such as alcoholysis or ozonolysis and subsequent chemical linking, for example by transesterification or dimerization, of the thus obtained degradation products or derivatives thereof. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Likewise suitable are, in addition, polyhydrocarbon polyols, also referred to as oligohydrocarbonols, for example polyhydroxy-functional ethylene-propylene, ethylene-butylene or ethylene-propylene-diene copolymers, for example those produced by Kraton Polymers, USA, or polyhydroxy-functional copolymers of dienes, such as 1,3-butanediene or diene mixtures, and vinyl monomers such as styrene, acrylonitrile or isobutylene, or polyhydroxy-functional polybutadiene polyols, for example those which are produced by copolymerization of 1,3-butadiene and allyl alcohol and which may also be hydrogenated.

Also suitable are polyhydroxy-functional acrylonitrile/butadiene copolymers, such as those that can be produced from epoxides or amino alcohols and carboxyl-terminated acrylonitrile/butadiene copolymers, which are commercially available under the name Hypro® (formerly Hycar®) CTBN from Emerald Performance Materials, LLC, USA.

All recited polyols have a mean molecular weight from 250 to 15 000 g/mol, preferably from 400 to 10 000 g/mol, more preferably from 1000 to 8000 g/mol and a mean OH functionality in the range from 1.5 to 4, preferably 1.7 to 3. However, it is entirely possible for the composition to also include proportions of monools (polymers having only one hydroxyl group).

Particularly suitable polyols are polyester polyols and polyether polyols, in particular polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol.

The first component A further comprises at least one diol A2 having two hydroxyl groups that are linked via a C2 to C9 carbon chain.

Suitable as diol A2 are linear or branched alkylene diols having two primary or secondary hydroxyl groups, alkylene diols having one primary and one secondary hydroxyl group, and cycloaliphatic diols.

The diol A2 is preferably a linear aliphatic diol having two primary hydroxyl groups that are linked via a C4 to C9 carbon chain. Such a diol has the advantage of yielding polyurethanes having particularly high moduli of elasticity in the region of low elongation, for example between 0 and 5%, which is advantageous for structural adhesives in particular.

In particular, the diol A2 is selected from the group consisting of ethylene glycol, 1,3-propanediol, 1,4-butanediol, 1,5-pentanediol, 1,6-hexanediol, 1,7-heptanediol, 1,8-octanediol, 1,9-nonanediol, 1,3-butanediol, 2,3-butanediol, 2-methyl-1,3-propanediol, 1,2-pentanediol, 2,4-pentanediol, 2-methyl-1,4-butanediol, 2,2-dimethyl-1,3-propanediol (neopentyl glycol), 1,2-hexanediol, 1,4-butanediol, 3-methyl-1,5-pentanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, and 1,4-cyclohexanedimethanol.

The diol A2 is more preferably selected from the group consisting of 1,4-butanediol, 1,5-pentanediol, 1,6-hexanediol, 1,7-heptanediol, 1,8-octanediol, and 1,9-nonanediol.

The diol A2 is most preferably selected from the group consisting of 1,4-butanediol, 1,5-pentanediol, 1,6-hexanediol, and 1,9-nonanediol. These diols are commercially readily available and provide polyurethanes having particularly high moduli of elasticity at low elongation when cured.

The first component A preferably comprises between 5 and 25% by weight, more preferably 10 to 15% by weight, of diol A2.

In addition to these recited polyols A1 and A2, it is possible to include small amounts of further low-molecular-weight dihydric or polyhydric alcohols such as diethylene glycol, triethylene glycol, the isomeric dipropylene glycols and tripropylene glycols, the isomeric decanediols and undecanediols, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low-molecular-weight alkoxylation products of the abovementioned dihydric and polyhydric alcohols, and also mixtures of the abovementioned alcohols. In addition, polyols containing other heteroatoms, for example methyldiethanolamine or thiodiglycol, may also be included.

The first component A further comprises at least one compound T that has at least one thiol group. Suitable are all compounds that have at least one thiol/mercapto group and that can be formulated into the composition according to the invention. A thiol group is understood here as meaning an —SH group that is attached to an organic radical, for example an aliphatic, cycloaliphatic or aromatic carbon radical.

Preference is given to compounds having 1 to 6, more preferably 1 to 4, most preferably 1 or 2 thiol groups. Compounds having a thiol group have the advantage that they do not form complexes with the metal catalyst K, which tend to be poorly soluble, and that the pot life can be adjusted particularly precisely. Compounds having two thiol groups have the advantage that the mechanical properties of the composition after curing are improved.

Examples of suitable compounds T having a thiol group are 3-mercaptopropyltrimethoxysilane, 3-mercaptopropyltriethoxysilane, 3-mercapto-1,2-propanediol, 2-mercaptotoluimidazole or 2-mercaptobenzothiazole.

Examples of suitable compounds T having more than one thiol group are ethylene glycol di(3-mercaptopropionate), ethylene glycol dimercaptoacetate, dipentaerythritol hexa(3- mercaptopropionate), 2,3-dimercapto-1,3,4-thiadiazole or pentaerythritol tetrakis(3-mercaptopropionate).

The compound T is preferably selected from the group consisting of ethylene glycol di(3-mercaptopropionate), ethylene glycol dimercaptoacetate, dipentaerythritol hexa(3-mercaptopropionate), and 3-mercaptopropyl trimethoxysilane.

The molar ratio of all the thiol groups in the at least one compound T to all metal atoms in the at least one metal catalyst K must be between 1:1 and 250:1. It is preferably between 2:1 and 150:1, more preferably between 5:1 and 100:1. This quantitive ratio allows the pot life to be adjusted, specifically within the intrinsic limits of the particular composition, through, for example, the content of catalyst, the reactivity of the isocyanates present, and the amount thereof. The lower limit of the pot life is the pot life that is obtained in a given composition when using a defined amount of catalyst without addition of compound T. In many situations suitable for use according to the invention as a structural adhesive or composite material matrix and as a consequence of the large number of isocyanate groups in the presence of a catalyst but without compound T, no effective pot life is achieved, and the composition starts to cure almost immediately on mixing the two components.

The upper limit of the adjustable pot life is accordingly the pot life that would be achieved through the uncatalyzed isocyanate-hydroxyl reaction if a catalyst is not used. Even without the use of a catalyst, this reaction will commence at some point after mixing the two components. However, the reaction without catalyst proceeds more slowly and with the development of poorer mechanical properties in the cured material.

The key advantage achieved by the two-component polyurethane composition according to the invention is a system that cures and hardens with extraordinary rapidity, while at the same time having an adequately long pot life that allows it to be processed in a user-friendly manner. This means, for example, that structural bonding may be carried out on relatively large substrates too, which can be subjected to mechanical stress just a very short time after application of the adhesive. This results, for example, in a significant shortening of throughput times in industrial production. A further advantage of the polyurethane compositions according to the invention is the possibility of being able to adjust the pot life as described above. This is very advantageous particularly in automated applications and can, for example, allow further optimization of throughput times in industrial production, since the pot life can be tailored to the desired use.

The second component B comprises firstly at least one polyisocyanate I.

The polyisocyanate I is present in relatively high amounts, which is very advantageous for the development of mechanical properties that are good enough for use as a structural adhesive or matrix for composite materials. The second component contains sufficient polyisocyanate I for it to comprise at least 5% by weight, preferably at least 6% by weight, more preferably at least 7.5% by weight of isocyanate groups based on the overall polyurethane composition.

All commercially available polyisocyanates suitable for polyurethane production, in particular diisocyanates, may be used as polyisocyanates I for the production of the polyurethane polymer in the composition according to the invention.

Suitable polyisocyanates are in particular monomeric di- or triisocyanates and also oligomers, polymers, and derivatives of monomeric di- or triisocyanates, and any mixtures thereof.

Suitable aromatic monomeric di- or triisocyanates are in particular tolylene 2,4- and 2,6-diisocyanate and any mixtures of these isomers (TDI), diphenylmethane 4,4'-, 2,4'-, and 2,2'-diisocyanate and any mixtures of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris (isocyanatomethyl)benzene, tris(4-isocyanatophenyl) methane, and tris(4-isocyanatophenyl) thiophosphate.

Suitable aliphatic monomeric di- or triisocyanates are in particular tetramethylene 1,4-diisocyanate, 2-methylpentamethylene 1,5-diisocyanate, hexamethylene 1,6-diisocyanate (HDI), 2,2,4- and 2,4,4-trimethylhexamethylene 1,6-diisocyanate (TMDI), decamethylene 1,10-diisocyanate, dodecamethylene 1,12-diisocyanate, lysine diisocyanate and lysine ester diisocyanate, cyclohexane 1,3- and 1,4-diisocyanate, 1-methyl-2,4- and -2,6-diisocyanatocyclohexane and any mixtures of these isomers (HTDI or $H_6$TDI), 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI or $H_{12}$MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethylxylylene 1,3- and 1,4-diisocyanate (m- and p-TMXDI) and bis(1-isocyanato-1-methylethyl)naphthalene, dimer and trimer fatty acid isocyanates such as 3,6-bis(9-isocyanatononyl)-4,5-di-(1-heptenyl)cyclohexene (dimeryl diisocyanate), and $\alpha,\alpha,\alpha',\alpha',\alpha'',\alpha''$-hexamethyl-1,3,5-mesitylene triisocyanate.

Preference among these is given to MDI, TDI, HDI, and IPDI.

Suitable oligomers, polymers, and derivatives of the recited monomeric di- and triisocyanates are in particular those derived from MDI, TDI, HDI, and IPDI. Particularly suitable among these are commercially available types, in particular HDI biurets such as Desmodur® N 100 and N 3200 (from Covestro), Tolonate® HDB and HDB-LV (from Vencorex), and Duranate® 24A-100 (from Asahi Kasei); HDI isocyanurates such as Desmodur® N 3300, N 3600, and N 3790 BA (all from Covestro), Tolonate® HDT, HDT-LV, and HDT-LV2 (from Vencorex), Duranate® TPA-100 and THA-100 (from Asahi Kasei), and Coronate® HX (from Nippon Polyurethane); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik); TDI oligomers such as Desmodur® IL (from Covestro); and also mixed isocyanurates based on TDI/HDI, for example as Desmodur® HL (from Covestro). Also particularly suitable are MDI forms that are liquid at room temperature (so-called "modified MDI"), which are mixtures of MDI with MDI derivatives such as, in particular, MDI carbodiimides or MDI uretonimines or MDI urethanes, known by trade names such as Desmodur® CD, Desmodur® PF, Desmodur® PC (all from Covestro) or Isonate® M 143 (from Dow), and mixtures of MDI and MDI homologs (polymeric MDI or PMDI), available under trade names such as Desmodur® VL, Desmodur® VL50, Desmodur®

VL R10, Desmodur® VL R20, Desmodur® VH 20 N, and Desmodur® VKS 20F (all from Covestro), Isonate® M 309, Voranate® M 229 and Voranate® M 580 (all from Dow) or Lupranat® M 10 R (from BASF). The abovementioned oligomeric polyisocyanates are in practice typically mixtures of substances having different degrees of oligomerization and/or chemical structures. They preferably have a mean NCO functionality of 2.1 to 4.0.

The polyisocyanate is preferably selected from the group consisting of MDI, TDI, HDI, and IPDI, and oligomers, polymers, and derivatives of the recited isocyanates, and mixtures thereof.

The polyisocyanate preferably contains isocyanurate, iminooxadiazinedione, uretdione, biuret, allophanate, carbodiimide, uretonimine or oxadiazinetrione groups.

Particularly preferred polyisocyanates are MDI forms that are liquid at room temperature. These are, in particular, so-called polymeric MDI and also MDI containing proportions of oligomers or derivatives thereof. The content of MDI (=diphenylmethane 4,4'-, 2,4'- or 2,2'-diisocyanate and any mixtures of these isomers) in such liquid MDI forms is preferably 50 to 95% by weight, more preferably 60 to 90% by weight.

More particularly preferred as the polyisocyanate is polymeric MDI and MDI forms that are liquid at room temperature and contain proportions of MDI carbodiimides or their adducts.

With these polyisocyanates, particularly good processing properties and particularly high strengths are obtained.

The polyisocyanate of the second component may contain proportions of polyurethane polymers having isocyanate groups. Either the second component may comprise a polyurethane polymer having isocyanate groups that was produced separately, or the polyisocyanate has been mixed with at least one polyol, in particular a polyether polyol, with the isocyanate groups present in a stoichiometric excess over the OH groups.

In the composition according to the invention, polyisocyanate I is preferably present in an amount from 10% by weight to 35% by weight, more preferably from 15% by weight to 30% by weight, particularly preferably from 20% by weight to 25% by weight, based on the overall composition.

The first component A and/or the second component B further comprises at least one metal catalyst K for the reaction of hydroxyl groups and isocyanate groups that is able to form thio complexes. Suitable metal catalysts K are thus all metal catalysts that may be used as a crosslinking catalyst in polyurethane chemistry and that can at the same time form thio complexes with thiols in the presence thereof.

The metal catalyst K is preferably present only in the first component A. This has the advantage of achieving better storage stability.

Examples of suitable metal catalysts are bismuth, zinc, tin or zirconium compounds, including complexes and salts of these metals.

The metal catalyst K preferably comprises a bismuth compound, in particular a bismuth(III) compound. In addition to the desired properties as a catalyst able to form thio complexes, bismuth compounds have the advantage of low acute toxicity.

A multiplicity of conventional bismuth catalysts may be used as the bismuth compound. Examples are bismuth carboxylates, for example bismuth acetate, oleate, octoate or neodecanoate, bismuth nitrate, bismuth halides such as the bromide, chloride, or iodide, bismuth sulfide, basic bismuth carboxylates such as bismuthyl neodecanoate, bismuth subgallate or bismuth subsalicylate, and mixtures thereof.

In a preferred embodiment, the metal catalyst K is a bismuth(III) complex containing at least one ligand based on 8-hydroxyquinoline. Such complexes are described in EP 1551895. This is preferably a bismuth(III) carboxylate containing one molar equivalent of an 8-hydroxyquinoline ligand.

In a further preferred embodiment, the metal catalyst K is a bismuth(III) complex containing at least one ligand based on a 1,3-ketoamide. Such complexes are described in EP 2791153. This is preferably a bismuth(III) carboxylate containing 1 to 3 molar equivalents of a 1,3-ketoamide ligand.

The polyurethane composition may contain, in addition to the constituents already mentioned, further constituents as known to the person skilled in the art from two-component polyurethane chemistry. These may be present in just one component or in both.

Preferred further constituents are inorganic or organic fillers, such as, in particular, natural, ground or precipitated calcium carbonates, optionally coated with fatty acids, in particular stearic acid, baryte (heavy spar), talcs, quartz powders, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres, and also flame-retardant fillers such as hydroxides or hydrates, in particular hydroxides or hydrates of aluminum, preferably aluminum hydroxide.

The addition of fillers is advantageous in that it increases the strength of the cured polyurethane composition.

The polyurethane composition preferably comprises at least one filler selected from the group consisting of calcium carbonate, carbon black, kaolin, baryte, talc, quartz powder, dolomite, wollastonite, kaolin, calcined kaolin, and mica. Particularly preferred as fillers are ground calcium carbonate, calcined kaolins or carbon black.

It may be advantageous to use a mixture of different fillers. Most preferred are combinations of ground calcium carbonates or calcined kaolins and carbon black.

The content of filler F in the composition is preferably in the range from 5% by weight to 50% by weight, more preferably 10% by weight to 40% by weight, particularly preferably 15% by weight to 30% by weight, based on the overall composition.

It is possible for further constituents to be additionally present, in particular solvents, plasticizers and/or extenders, pigments, rheology modifiers such as, in particular, amorphous silicas, desiccants such as, in particular, zeolites, adhesion promoters such as, in particular, organofunctional trialkoxysilanes, stabilizers against oxidation, heat, light, and UV radiation, flame-retardant substances, and also surface-active substances, in particular wetting agents and defoamers.

The polyurethane composition comprises preferably less than 0.5% by weight, in particular less than 0.1% by weight of carboxylic acids, based on the overall composition. Any carboxylate ligands introduced through the metal catalyst are not included here among the stated carboxylic acids.

A preferred polyurethane composition comprises a first component A comprising 30 to 90% by weight, preferably 40 to 80% by weight, in particular 50 to 70% by weight, of polyol A1, 5 to 25% by weight, preferably 10 to 20% by weight, in particular 12 to 18% by weight, of diol A2, 1 to 5% by weight, preferably 1.25 to 3% by weight, in particular 1.5 to 2% by weight, of a compound T having at least one thiol group, 0.05 to 0.5% by weight, preferably 0.1 to 0.3% by weight, in particular 0.15 to 0.2% by weight, of a metal catalyst K, and 10 to 50% by weight, preferably 15 to 40% by weight, in particular 20 to 30% by weight, of fillers, and optionally further constituents.

A preferred polyurethane composition comprises a second component B comprising 40% to 100% by weight, in particular 45% to 80% by weight, of polyisocyanate I.

It is advantageous if the first and second components are formulated so that their mixing ratio in parts by weight is in the range from 10:1 to 1:10, preferably from 5:1 to 1:5, in particular from 2:1 to 1:2.

In the mixed polyurethane composition, the ratio before curing between the number of isocyanate groups and the number of groups reactive toward isocyanates is preferably approximately in the range of 1.2 to 1, more preferably 1.15 to 1.05. However, it is also possible, although not usually preferred, for the proportion of isocyanate groups to be substoichiometric with respect to groups reactive toward isocyanates.

The production of the two components is carried out separately and preferably with the exclusion of moisture. The two components are typically each stored in a separate container. The further constituents of the polyurethane composition may be present as a constituent of the first or second component, with further constituents that are reactive toward isocyanate groups preferably being a constituent of the first component. A suitable container for the storage of each component is in particular a drum, a hobbock, a bag, a bucket, a can, a cartridge or a tube. The components are both storage-stable, meaning that they can be stored prior to use for several months up to one year or longer, without any change in their respective properties to a degree relevant to their use.

The two components are stored separately prior to the mixing of the composition and are mixed with one another only on use or immediately prior to this. They are advantageously present in a package consisting of two separate chambers.

In a further aspect, the invention comprises a pack consisting of a package having two separate chambers which respectively contain the first component and the second component of the composition.

The mixing is typically effected via static mixers or with the aid of dynamic mixers. During mixing, care must be taken to ensure that the two components are mixed as homogeneously as possible. If the two components are mixed incompletely, local deviations from the advantageous mixing ratio will occur, which can result in a deterioration in the mechanical properties.

On contact of the first component with the second component, curing commences through chemical reaction. This involves reaction of the hydroxyl groups and any other substances present that are reactive toward isocyanate groups with the isocyanate groups. Excess isocyanate groups react predominantly with moisture. As a result of these reactions, the polyurethane composition cures to give a solid material. This operation is also referred to as cross-linking.

The invention thus also further provides a cured polyurethane composition obtained from the curing of the polyurethane composition as described in the present document.

The two-component polyurethane composition described is advantageously usable as structural adhesive, potting compound or matrix in composite materials.

The invention thus also relates to a process for bonding a first substrate to a second substrate, comprising the steps of:
mixing the first and second components described above,
applying the mixed polyurethane composition to at least one of the substrate surfaces to be bonded,
joining the substrates to be bonded within the pot life,
curing the polyurethane composition.

These two substrates may consist of the same material or different materials.

The invention thus also further relates to a process for filling joins and gaps between two substrates, comprising the steps of:
mixing the first and second components described above,
applying the mixed polyurethane composition to the join or gap,
curing the polyurethane composition.

In these processes for bonding or for filling joins and gaps, suitable substrates are in particular
glass, glass ceramic, glass mineral fiber mats;
metals and alloys such as aluminum, iron, steel and nonferrous metals, and also surface-finished metals and alloys such as galvanized or chromed metals;
coated and painted substrates, such as powder-coated metals or alloys and painted sheet metal;
plastics, such as polyvinyl chloride (rigid and flexible PVC), acrylonitrile-butadiene-styrene copolymers (ABS), polycarbonate (PC), polyamide (PA), poly(methyl methacrylate) (PMMA), polyester, epoxy resins, in particular epoxy-based thermosets, polyurethanes (PUR), polyoxymethylene (POM), polyolefins (PO), polyethylene (PE) or polypropylene (PP), ethylene/propylene copolymers (EPM), and ethylene/propylene/diene terpolymers (EPDM), wherein the plastics may preferably have been surface-treated by means of plasma, corona or flames;
fiber-reinforced plastics, such as carbon fiber-reinforced plastics (CFP), glass fiber-reinforced plastics (GFP) and sheet-molding compounds (SMC);
wood, woodbase materials bonded with resins, for example phenolic, melamine or epoxy resins, resin-textile composites and further so-called polymer composites; and
concrete, mortar, brick, plaster, and natural stone such as granite, limestone, sandstone or marble.

In these processes, one or both substrates is preferably a metal or a glass ceramic or a glass or a glass fiber-reinforced plastic or a carbon fiber-reinforced plastic or an epoxy-based thermoset.

If required, the substrates can be pretreated prior to application of the composition. Such pretreatments include, in particular, physical and/or chemical cleaning processes and the application of an adhesion promoter, an adhesion promoter solution or a primer.

The bonding process described gives rise to an article in which the composition joins two substrates to one another.

This article is in particular a sandwich element of a lightweight structure, a built structure, for example a bridge, an industrial product or a consumer product, in particular a window, a rotor blade of a wind turbine or a mode of transport, in particular a vehicle, preferably an automobile, a bus, a truck, a rail vehicle or a ship, or else an aircraft or a helicopter, or an installable component of such an article.

The polyurethane composition described is characterized by high strength and elasticity that is highly constant over a wide temperature range from −35° C. to 85° C. and by good, largely temperature-independent adhesion properties on metallic substrates. On account of these properties, it is very particularly suitable as structural adhesive for bonds that are subjected to stress outdoors at ambient temperatures.

The invention thus also further provides for the use of the described polyurethane composition as structural adhesive for bonding two substrates.

The polyurethane composition described is likewise advantageously usable as a potting compound, in particular as a potting compound for filling gaps and joins, for repair purposes, as a ballast compensation compound or for the protection of electronic components.

The polyurethane composition is further preferably used as a potting compound, in particular as an electrical potting compound. In a further aspect, the invention therefore encompasses the use of a two-component polyurethane composition as a potting compound, in particular as an electrical potting compound.

In a further aspect, the invention therefore encompasses a process for filling joins and gaps in a substrate, comprising the steps of
a) mixing the first component and the second component of a two-component polyurethane composition as described above,
b) applying the mixed polyurethane composition to the join to be bridged between two substrates or to the gap to be filled on the surface of a substrate,
c) curing the polyurethane composition in the join or gap.

Particularly suitable substrates are metal, plastic, wood, glass, ceramic and fiber-reinforced plastics, in particular metal and fiber-reinforced plastics.

In a further aspect, the invention therefore also encompasses a filled article that has been filled by the process described above.

The polyurethane composition is further preferably used as matrix in composite materials. The polyurethane composition serves here as a binder into which fibers or other reinforcing structures are embedded. In a further aspect, the invention therefore encompasses the use of a two-component polyurethane composition as matrix in composite materials.

The invention is further elucidated hereinafter by examples, but these are not intended to restrict the invention in any way.

EXAMPLES

Substances Used:

| | |
|---|---|
| Voranol CP 4755 | Voranol ® CP 4755 (Dow Chemical); polyether triol, CAS No. 9082-00-2; MW: 5000 g/mol; OH value: 35 mg KOH/g |
| 1,4-Butanediol | (Sigma Aldrich) |
| 1,5-Pentanediol | (Sigma Aldrich) |
| Silquest A-189 | Silquest ® A-189 (Momentive) 3-mercaptopropyltrimethoxysilane |
| Thiocure GDMA | Thiocure ® GDMA (Bruno Bock Thiochemicals); glycol dimercaptoacetate |
| Thiocure Di-PETMP | Thiocure ® Di-PETMP (Bruno Bock Thiochemicals); dipentaerythritol hexa(3-mercaptopropionate) |
| Thiocure GDMP | Thiocure ® GDMP (Bruno Bock Thiochemicals); glycol di(3-mercaptopropionate) |
| Polymer 1 | NCO-functional polyether polyurethane (preparation see below); 2.3% by weight NCO |
| Desmodur CD-L | Desmodur ® CD-L (Covestro); modified diphenylmethane 4,4'-diisocyanate (MDI); NCO content: 29.5% by weight |
| Desmodur 44 MC liquid | Desmodur ® 44 MC liquid (Covestro); monomeric diphenylmethane 4,4'-diisocyanate (MDI); NCO content: 33.6% by weight |
| Monarch 570 | Monarch ® 570 (Cabot Corp.); carbon black (filler) |
| Whitetex | White Tex ® (BASF); calcined aluminum silicate (filler) |
| Bi cat. (2.68 mmol Bi/g) | 35% by weight Coscat 83 (organobismuth catalyst; Coscat ® 83 (Vertellus Specialties Inc.)) in plasticizer containing 1 molar equivalent of 8-hydroxyquinoline (based on Bi) |

Preparation of Polymer 1

1300 g of polyoxypropylene diol (Acclaim® 4200 N, Covestro; OH value 28.5 mg KOH/g), 2600 g of polyoxypropylenepolyoxyethylene triol (Voranol® CP 4755, Dow Chemical Company; OH value 34.0 mg KOH/g), 600 g of 4,4'-methylene diphenyl diisocyanate (4,4'-MDI; Desmodur® 44 MC L, Covestro), and 500 g of diisodecyl phthalate (DIDP; Palatinol® Z, BASF SE, Germany) were reacted at 80° C. by a known method to give an NCO-terminated polyurethane polymer having a content of isocyanate groups of 2.3% by weight.

Preparation of Polyurethane Compositions

For each composition, the ingredients of the first component A specified in the tables were processed in the amounts specified (in parts by weight or wt.-%), by means of a vacuum dissolver with the exclusion of moisture, into a homogeneous paste and stored. The ingredients of the second component B specified in the tables were processed in similar manner and stored. The two components were then processed for 30 seconds, by means of a SpeedMixer® (DAC 150 FV, Hauschild), into a homogeneous paste, which was immediately tested as follows:

To determine the mechanical properties, the adhesive was fashioned into a dumbbell shape according to ISO 527, Part 2, 1B and cured/stored at 23° C. and 50% RH (relative humidity) for the time specified in the tables (1 day and 7 days) and then at 90° C. for 7 days. After a conditioning period of 24 h at 23° C. and 50% RH, the modulus of elasticity in the region from 0.05 to 0.25% elongation, the tensile strength, and the elongation at break of the test specimens thus produced were measured according to DIN EN ISO 527 on a Zwick Z020 tensile tester at 23° C. and 50% RH and a testing speed of 10 mm/min.

The tear propagation resistance was determined according to DIN ISO 34-1. To measure the tensile shear strength, various test specimens were produced, in each case by applying the adhesive 1 minute after the end of the mixing time between two heptane-degreased cathodically-electrocoated steel plates in a layer thickness of 2 mm and over an overlapping bonding area of 15×45 mm. The test specimens were stored/cured for 24 h at 23° C. and then for 3 h at 80° C. After a conditioning period of 24 h at 23° C. and 50% RH, the tensile shear strength was determined according to DIN EN 1465.

The Tg values (glass transition temperatures) were determined using a Mettler DMA/SDTA 861e instrument on the basis of DMTA measurements on disk-shaped samples (thickness 2-3 mm, diameter 10 mm), which were cured for 7 days under standard climatic conditions ("SC"; 23° C., 50% relative humidity "RH"). The measurement conditions were: measurement in shear mode, excitation frequency 10 Hz, and heating rate of 5 K/min. The samples were cooled to −60° C. and heated to 200° C. with determination of the complex shear modulus G* [MPa], with a maximum in the curve for the loss angle "tan δ" being read off as Tg value.

The pot life was measured in a viscometer as the time until the viscosity began to rise steeply after mixing the two components. Specifically, the intercept of the slope of the viscosity (y axis) with the time (x axis) was defined as the pot life. The viscosity was measured on an MCR 302 parallel-plate rheometer (Anton Paar) with a plate diameter of 25 mm and a plate distance of 1 mm at a frequency of 10 $s^{-1}$ and a temperature of 20° C. This was done by first mixing the two components for 30 sec in a SpeedMixer (Hauschild) and immediately applying them to the plates for the measurement.

The results of the measurements are given in the tables.

Tables 1 to 6 show experiments to demonstrate the influence on the pot life of the amount of compound T, which has at least one thiol group.

Tables 7 to 10 show adhesive compositions tested in respect of pot life, cure profile, and mechanics. Here, compositions according to the invention are identified as "I" (I-1 to I-4) and non-inventive reference compositions as "R" (R-1 to R-6).

TABLE 1

Preliminary experiments V-1a to V-1f.

| Example | V-1a | V-1b | V-1c | V-1d | V-1e | V-1f |
|---|---|---|---|---|---|---|
| First component A (amounts in parts by weight) | | | | | | |
| Voranol CP 4755 | 97.5 | 97.5 | 97.5 | 97.5 | 97.5 | 97.5 |
| 1,4-Butanediol | 2.5 | 2.5 | 2.5 | 2.5 | 2.5 | 2.5 |
| Silquest A-189 | 0 | 0.32 | 0.64 | 1.28 | 3.19 | 6.39 |
| Second component B (amounts in parts by weight) | | | | | | |
| Polymer 1 | 89 | 89 | 89 | 89 | 89 | 89 |
| Desmodur CD-L | 10 | 10 | 10 | 10 | 10 | 10 |
| Bi cat. (2.68 mmol Bi/g) | 1 | 1 | 1 | 1 | 1 | 1 |
| Properties of the mixture of the two components A and B | | | | | | |
| Molar ratio SH:Bi | 0 | 5:1 | 10:1 | 20:1 | 50:1 | 100:1 |
| Pot life [min] | 0 | 0 | 0 | 1 | 8 | 23 |

TABLE 2

Preliminary experiments V-2a to V-2f.

| Example | V-2a | V-2b | V-2c | V-2d | V-2e | V-2f |
|---|---|---|---|---|---|---|
| First component A (amounts in parts by weight) | | | | | | |
| Voranol CP 4755 | 95 | 95 | 95 | 95 | 95 | 95 |
| 1,4-Butanediol | 5 | 5 | 5 | 5 | 5 | 5 |
| Silquest A-189 | 0 | 0.32 | 0.64 | 1.28 | 3.19 | 6.39 |
| Second component B (amounts in parts by weight) | | | | | | |
| Polymer 1 | 79.5 | 79.5 | 79.5 | 79.5 | 79.5 | 79.5 |
| Desmodur CD-L | 20 | 20 | 20 | 20 | 20 | 20 |
| Bi cat. (2.68 mmol Bi/g) | 0.5 | 0.5 | 0.5 | 0.5 | 0.5 | 0.5 |
| Properties of the mixture of the two components A and B | | | | | | |
| Molar ratio SH:Bi | 0 | 5:1 | 10:1 | 20:1 | 50:1 | 100:1 |
| Pot life [min] | 0 | 0 | 0 | 0 | 4 | 16 |

TABLE 3

Preliminary experiments V-3a to V-3f.

| Example | V-3a | V-3b | V-3c | V-3d | V-3e | V-3f |
|---|---|---|---|---|---|---|
| First component A (amounts in parts by weight) | | | | | | |
| Voranol CP 4755 | 97.5 | 97.5 | 97.5 | 97.5 | 97.5 | 97.5 |
| 1,4-Butanediol | 2.5 | 2.5 | 2.5 | 2.5 | 2.5 | 2.5 |
| Thiocure GDMA | 0 | 0.14 | 0.28 | 0.56 | 1.41 | 2.82 |
| Second component B (amounts in parts by weight) | | | | | | |
| Polymer 1 | 89 | 89 | 89 | 89 | 89 | 89 |
| Desmodur CD-L | 10 | 10 | 10 | 10 | 10 | 10 |
| Bi cat. (2.68 mmol Bi/g) | 1 | 1 | 1 | 1 | 1 | 1 |
| Properties of the mixture of the two components A and B | | | | | | |
| Molar ratio SH:Bi | 0 | 5:1 | 10:1 | 20:1 | 50:1 | 100:1 |
| Pot life [min] | 0 | 15 | 41 | 60 | 110 | 210 |

TABLE 4

Preliminary experiments V-4a to V-4f.

| Example | V-4a | V-4b | V-4c | V-4d | V-4e | V-4f |
|---|---|---|---|---|---|---|
| First component A (amounts in parts by weight) | | | | | | |
| Voranol CP 4755 | 95 | 95 | 95 | 95 | 95 | 95 |
| 1,4-Butanediol | 5 | 5 | 5 | 5 | 5 | 5 |
| Thiocure GDMA | 0 | 0.14 | 0.28 | 0.56 | 1.41 | 2.82 |
| Second component B (amounts in parts by weight) | | | | | | |
| Polymer 1 | 79.5 | 79.5 | 79.5 | 79.5 | 79.5 | 79.5 |
| Desmodur CD-L | 20 | 20 | 20 | 20 | 20 | 20 |
| Bi cat. (2.68 mmol Bi/g) | 0.5 | 0.5 | 0.5 | 0.5 | 0.5 | 0.5 |
| Properties of the mixture of the two components A and B | | | | | | |
| Molar ratio SH:Bi | 0 | 5:1 | 10:1 | 20:1 | 50:1 | 100:1 |
| Pot life [min] | 0 | 0 | 4 | 7 | 19 | 42 |

TABLE 5

Preliminary experiments V-5a to V-5f.

| Example | V-5a | V-5b | V-5c | V-5d | V-5e | V-5f |
|---|---|---|---|---|---|---|
| First component A (amounts in parts by weight) | | | | | | |
| Voranol CP 4755 | 97.5 | 97.5 | 97.5 | 97.5 | 97.5 | 97.5 |
| 1,4-Butanediol | 2.5 | 2.5 | 2.5 | 2.5 | 2.5 | 2.5 |
| Thiocure Di-PETMP | 0 | 0.32 | 0.64 | 1.28 | 3.19 | 6.39 |
| Second component B (amounts in parts by weight) | | | | | | |
| Polymer 1 | 89 | 89 | 89 | 89 | 89 | 89 |
| Desmodur CD-L | 10 | 10 | 10 | 10 | 10 | 10 |
| Bi cat. (2.68 mmol Bi/g) | 1 | 1 | 1 | 1 | 1 | 1 |
| Properties of the mixture of the two components A and B | | | | | | |
| Molar ratio SH:Bi | 0 | 5:1 | 10:1 | 20:1 | 50:1 | 100:1 |
| Pot life [min] | 0 | 200 | 400 | 850 | >1000 | >1000 |

TABLE 6

Preliminary experiments V-6a to V-6f.

| Example | V-6a | V-6b | V-6c | V-6d | V-6e | V-6f |
|---|---|---|---|---|---|---|
| First component A (amounts in parts by weight) | | | | | | |
| Voranol CP 4755 | 95 | 95 | 95 | 95 | 95 | 95 |
| 1,4-Butanediol | 5 | 5 | 5 | 5 | 5 | 5 |
| Thiocure Di-PETMP | 0 | 0.32 | 0.64 | 1.28 | 3.19 | 6.39 |
| Second component B (amounts in parts by weight) | | | | | | |
| Polymer 1 | 79.5 | 79.5 | 79.5 | 79.5 | 79.5 | 79.5 |
| Desmodur CD-L | 20 | 20 | 20 | 20 | 20 | 20 |
| Bi cat. (2.68 mmol Bi/g) | 0.5 | 0.5 | 0.5 | 0.5 | 0.5 | 0.5 |
| Properties of the mixture of the two components A and B | | | | | | |
| Molar ratio SH:Bi | 0 | 5:1 | 10:1 | 20:1 | 50:1 | 100:1 |
| Pot life [min] | 0 | 40 | 200 | 400 | 1200 | >2000 |

The preliminary experiments V1a to V6f show experiments demonstrating the influence on the pot life of various compounds T having at least one thiol group and also the possibility of being able to adjust the pot life within certain limits.

The results show clearly that the pot life in two-component polyurethane compositions that could not be processed at all in the absence of compound T can be adjusted through the use of compounds T via the molar ratio of thiol groups to metal atoms in the catalyst.

TABLE 7

| Example | I-1 | R-1 | R-2 | R-3 | I-2 |
|---|---|---|---|---|---|
| First component A (amounts in wt.-%, based on first component A) | | | | | |
| Voranol CP 4755 | 60 | 60.5 | 63 | 62.5 | 61.25 |
| 1,5-Pentanediol | 12 | 12 | 12 | 12 | 12 |
| Monarch 570 | 10 | 10 | 10 | 10 | 10 |
| Whitex | 15 | 15 | 15 | 15 | 15 |
| Thiocure GDMP | 2.5 | 2.5 | — | — | 1.25 |
| Bi cat. | 0.5 | — | — | 0.5 | 0.5 |
| TOTAL | 100 | 100 | 100 | 100 | 100 |
| Second component B (amounts in wt.-%, based on first component B) | | | | | |
| Desmodur CD-L | 44 | 44 | 44 | 44 | 44 |
| Voranol CP-4755 | 32 | 32 | 32 | 32 | 32 |
| Whitex | 15 | 15 | 15 | 15 | 15 |
| Monarch 570 | 10 | 10 | 10 | 10 | 10 |
| TOTAL | 100 | 100 | 100 | 100 | 100 |
| Mixing ratio A:B (v/v) | 1:1 | 1:1 | 1:1 | 1:1 | 1:1 |
| NCO content [%] * | | | 6.1 | | |

* NCO content in wt.-% of isocyanate groups based on the overall polyurethane composition.

TABLE 8

| Example | I-3 | R-4 | R-5 | R-6 | I-4 |
|---|---|---|---|---|---|
| First component A (amounts in wt.-%, based on first component A) | | | | | |
| Voranol CP 4755 | 56 | 56.5 | 59.5 | 59 | 57.5 |
| 1,5-Pentanediol | 18 | 18 | 18 | 18 | 18 |
| Monarch 570 | 12.5 | 12.5 | 12.5 | 12.5 | 12.5 |
| Whitetex | 10 | 10 | 10 | 10 | 10 |
| Thiocure GDMP | 3 | 3 | — | — | 1.5 |
| Bi cat. | 0.5 | — | — | 0.5 | 0.5 |
| TOTAL | 100 | 100 | 100 | 100 | 100 |
| Second component B (amounts in wt.-%, based on first component B) | | | | | |
| Desmodur CD-L | 30 | 30 | 30 | 30 | 30 |
| Desmodur 44 MC liquid | 25 | 25 | 25 | 25 | 25 |

TABLE 8-continued

| Example | I-3 | R-4 | R-5 | R-6 | I-4 |
|---|---|---|---|---|---|
| Voranol CP-4755 | 22.5 | 22.5 | 22.5 | 22.5 | 22.5 |
| Monarch 570 | 12.5 | 12.5 | 12.5 | 12.5 | 12.5 |
| Whitetex | 10 | 10 | 10 | 10 | 10 |
| TOTAL | 100 | 100 | 100 | 100 | 100 |
| Mixing ratio A:B (v/v) | 1:1 | 1:1 | 1:1 | 1:1 | 1:1 |
| NCO content [%] * | | | 8.1 | | |

* NCO content in wt.-% of isocyanate groups based on the overall polyurethane composition.

The results in tables 9 and 10 show clearly that the compositions according to the invention very rapidly build up strength, in particular tensile strength and tensile shear strength, and are significantly superior to the non-inventive compositions with regard to mechanical properties, curing rate, and even adhesion profile.

TABLE 9

| Example | | I-1 | R-1 | R-2 | R-3 | I-2 |
|---|---|---|---|---|---|---|
| Pot life [min] | | 62 | 85 | 75 | 18 | 32 |
| Tensile shear | 1 h SC | 2.2 (0) | n.d. | n.d. | 0.84 (0) | 4.3 (60) |
| strength [MPa] | 2 h SC | 12.3 (100) | 0.1 (0) | 0.1 (0) | 1.7 (0) | 8.7 (100) |
| (Proportion of | 4 h SC | 13.5 (100) | 0.2 (0) | 0.2 (0) | 3.4 (30) | 10.5 (100) |
| cohesive break | 1 d SC | 14.6 (100) | 1.1 (0) | 2.0 (0) | 9.1 (100) | 12.4 (100) |
| [%]) | 7 d SC | 12.8 (100) | 8.7 (100) | 11.4 (100) | 13.6 (100) | 11.9 (100) |
| Tensile strength | 1 d SC | 16.2 (76.7) | 4.1 (130) | 5.5 (160) | 12.9 (125) | 13.8 (100) |
| [MPa] | 7 d SC | 14.2 (83.2) | 9.2 (159) | 9.33 (154) | 12.5 (151) | 10.3 (101) |
| (Modulus of elasticity [MPa]) | 7 d NC + 7 d 90° C. | 20.5 (96) | 12.7 (178) | 14.2 (177) | 14.2 (139) | 15.0 (107) |
| Elongation at | 1 d SC | 264 | 18.4 | 34.1 | 213.6 | 218.5 |
| break [%] | 7 d SC | 195.5 | 97.6 | 131.8 | 139.2 | 107.3 |
| | 7 d NC + 7 d 90° C. | 352.6 | 170.6 | 224.5 | 172.1 | 233.4 |
| Tear propagation resistance [MPa] | 7 d SC | 26.4 | 36.3 | 34.5 | 32.4 | 26.9 |
| Tg [° C.] | 7 d SC | −25.5 | −49.7 | −52.1 | −46.6 | −42.1 | n.d. = not determined

TABLE 10

| Example | | I-3 | R-4 | R-5 | R-6 | I-4 |
|---|---|---|---|---|---|---|
| Pot life [min] | | 30 | 33 | 32 | 4 | 19 |
| Tensile shear | 1 h SC | 5.5 (10) | 0.2 (0) | 0.3 (0) | 1.9 (0) | 3.4 (0) |
| strength [MPa] | 2 h SC | 7.3 (40) | 0.8 (0) | 1.1 (0) | 2.5 (0) | 4.8 (0) |
| (Proportion of | 4 h SC | 7.9 (100) | 1.1 (0) | 1.2 (0) | 5.4 (0) | 7.0 (10) |
| cohesive break | 1 d SC | 14.1 (100) | 4.2 (50) | 4.7 (50) | 8.1 (80) | 13.0 (100) |
| [%]) | 7 d SC | 14.7 (100) | 8.9 (100) | 11.5 (100) | 12.5 (100) | 13.0 (100) |
| Tensile strength | 1 d SC | 14.7 (341.6) | 7.2 (349) | 7.4 (360) | 12.8 (347) | 14.1 (361) |
| [MPa] | 7 d SC | 20.1 (338) | 14.1 (456) | 15.2 (483) | 18.4 (391) | 13.7 (450) |
| (Modulus of elasticity [MPa]) | 7 d NC + 7 d 90° C. | 21.5 (353) | 21.3 (479) | 17.3 (450) | 16.3 (394) | 18.4 (369) |
| Elongation at | 1 d SC | 132.1 | 4.4 | 4.4 | 94.5 | 93.6 |
| break [%] | 7 d SC | 266.7 | 175.3 | 177.5 | 231.8 | 52.3 |
| | 7 d NC + 7 d 90° C. | 237.3 | 314.3 | 132.1 | 99.8 | 191.3 |
| Tear propagation resistance [MPa] | 7 d SC | 58.8 | 66.0 | 70.8 | 63.3 | 59.3 |
| Tg [° C.] | 7 d SC | −45.8 | −52.8 | −52.2 | −49.0 | −48.6 |

The invention claimed is:

1. A polyurethane composition consisting of a first and a second component; wherein the first component A comprises at least one polyol A1 having an OH functionality in the range from 1.5 to 4 and a number average molecular weight $M_n$ in the range from 250 to 15,000 g/mol, and at least one diol A2 having two hydroxyl groups that are linked via a C2 to C9 carbon chain, and at least one compound T that has at least one thiol group; and the second component B comprises at least one polyisocyanate I; wherein the composition comprises less than 0.1% by weight of carboxylic acids, based on the overall composition, one of the two components additionally comprises at least one metal catalyst K for the reaction of hydroxyl groups and isocyanate groups that is able to form thio complexes and the second component contains sufficient polyisocyanate I for it to comprise at least 7.5% by weight of isocyanate groups based on the overall polyurethane composition, and the molar ratio of all the thiol groups in the at least one compound T to all metal atoms in the at least one metal catalyst K is between 1:1 and 250:1.

2. The polyurethane composition as claimed in claim 1, wherein the metal catalyst K comprises a bismuth(III) compound.

3. The polyurethane composition as claimed in claim 2, wherein the bismuth(III) compound additionally contains an 8-hydroxyquinoline ligand or a 1,3-ketoamide ligand.

4. The polyurethane composition as claimed in claim 1, wherein the diol A2 is a linear aliphatic diol having two primary hydroxyl groups that are linked via a C4 to C9 carbon chain.

5. The polyurethane composition as claimed in claim 1, wherein the at least one compound T comprises a polythiol compound having 2 to 6 thiol groups, or a mercaptosilane.

6. The polyurethane composition as claimed in claim 5, wherein the at least one compound T is selected from the group consisting of ethylene glycol di(3-mercaptopropionate), ethylene glycol dimercaptoacetate, dipentaerythritol hexa(3-mercaptopropionate), and 3-mercaptopropyltrimethoxysilane.

7. The polyurethane composition as claimed in claim 1, wherein the molar ratio of all the thiol groups in the at least one compound T to all metal atoms in the at least one metal catalyst K is between 5:1 and 100:1.

8. The polyurethane composition as claimed in claim 1, wherein the metal catalyst K is present in the first component A.

9. The polyurethane composition as claimed in claim 1, wherein the polyol A1 comprises a polyether polyol.

10. The polyurethane composition as claimed in claim 1, wherein the polyisocyanate I is a form of diphenylmethane 4,4'-, 2,4'- or 2,2'-diisocyanate that is liquid at room temperature and any mixtures of these isomers (MDI) in the form of polymeric MDI or MDI containing proportions of oligomers or derivatives.

11. The polyurethane composition as claimed in claim 1, wherein the second component B comprises a polyurethane polymer containing isocyanate groups.

12. A process for bonding a first substrate to a second substrate, comprising the steps of:
    mixing the first and second components of a polyurethane composition as claimed in claim 1,
    applying the mixed polyurethane composition to at least one of the substrate surfaces to be bonded,
    joining the substrates to be bonded within the open time,
    curing the polyurethane composition.

13. An article resulting from the bonding process as claimed in claim claim 12.

14. The polyurethane composition as claimed in claim 1, wherein the second component contains sufficient polyisocyanate I for it to comprise at least 8.1% by weight of isocyanate groups based on the overall polyurethane composition.

15. A composite material comprising a structural adhesive and at least one substrate, wherein the structural adhesive is formed from the polyurethane composition as claimed in claim 1 by mixing the first and second components of the polyurethane composition and applying the mixture to a surface of the at least one substrate.

16. A composite material that comprises a matrix and at least one material held together via the matrix, wherein the matrix is formed from the polyurethane composition as claimed in claim 1 by mixing the first and second components of the polyurethane composition and applying the mixture to a surface of the at least one material.

17. A polyurethane composition consisting of a first and a second component; wherein
    the first component A comprises
        at least one polyol A1 selected from the group consisting of polyoxyethylene diol, polyoxypropylene diol, polyoxyethylene triol, polyoxypropylene triol, polyoxypropylene polyoxyethylene diol, and polyoxypropylene polyoxyethylene triol and a number average molecular weight $M_n$ in the range from 1,000 to 8,000 g/mol, and
        at least one diol A2 selected from the group consisting of 1,4-butanediol, 1,5-pentanediol, 1,6-hexanediol, and 1,9-nonanediol, and
        at least one compound T selected from the group consisting of ethylene glycol di(3-mercaptopropionate), ethylene glycol dimercaptoacetate, dipentaerythritol hexa(3-mercaptopropionate); and
    the second component B comprises
        at least one polyisocyanate I the polyisocyanate I being a form of diphenylmethane 4,4'-, 2,4'- or 2,2'-diisocyanate that is liquid at room temperature and any mixtures of these isomers (MDI) in the form of polymeric MDI or MDI containing proportions of oligomers or derivatives; wherein
    the composition comprises less than 0.1% by weight of carboxylic acids, based on the overall composition,
    one of the two components additionally comprises at least one metal catalyst K for the reaction of hydroxyl groups and isocyanate groups that is able to form thio complexes and
    the second component contains sufficient polyisocyanate I for it to comprise at least 7.5% by weight of isocyanate groups based on the overall polyurethane composition, and the molar ratio of all the thiol groups in the at least one compound T to all metal atoms in the at least one metal catalyst K is between 5:1 and 100:1.

18. The polyurethane composition as claimed in claim 17, wherein the second component contains the polyisocyanate I in an amount sufficient for it to comprise at least 8.1% by weight of isocyanate groups based on the overall polyurethane composition.

* * * * *